United States Patent
Goldman (10) Patent No.: US 11,227,426 B2
(45) Date of Patent: Jan. 18, 2022

(54) SMOOTHED NORMALS FROM DEPTH MAPS FOR NORMAL-BASED TEXTURE BLENDING

(71) Applicant: GOOGLE LLC, Mountain View, CA (US)

(72) Inventor: Daniel Goldman, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/321,962

(22) PCT Filed: Nov. 15, 2018

(86) PCT No.: PCT/US2018/061265
§ 371 (c)(1),
(2) Date: Jan. 30, 2019

(87) PCT Pub. No.: WO2019/103907
PCT Pub. Date: May 31, 2019

(65) Prior Publication Data
US 2020/0160585 A1    May 21, 2020

Related U.S. Application Data

(60) Provisional application No. 62/590,505, filed on Nov. 24, 2017.

(51) Int. Cl.
*G06T 15/04*    (2011.01)
*G06T 7/55*    (2017.01)
(Continued)

(52) U.S. Cl.
CPC .............. *G06T 15/04* (2013.01); *G06T 5/002* (2013.01); *G06T 5/50* (2013.01); *G06T 7/0002* (2013.01);
(Continued)

(58) Field of Classification Search
None
See application file for complete search history.

(56) References Cited

U.S. PATENT DOCUMENTS 6,603,474 B1 * 8/2003 Cobb ...................... G06T 15/40
345/421
9,171,402 B1    10/2015 Allen et al.
(Continued)

OTHER PUBLICATIONS

Zhang, Eugene, and Greg Turk. "Visibility-guided simplification." IEEE Visualization, 2002. VIS 2002. IEEE, 2002 (Year: 2002).*
(Continued)

*Primary Examiner* — Sarah Le
(74) *Attorney, Agent, or Firm* — Brake Hughes Bellermann LLP (57) ABSTRACT

Techniques of smoothing surface normals in a texture mapping application involve generating smoothed normals from the perspective of each camera using to capture images for texture mapping. Along these lines, a camera used to capture an image for texture mapping is situated at an orientation relative to the geometrical object onto which a texture mapping computer maps the texture image. The texture mapping computer places a filter window centered at a point on the geometrical object. The texture mapping computer then generates, as the smoothed normal at that point, an average normal over points in the filter window. The average normals thus computed for each camera are then used in the weights of the weighted average that is the image value at that point.

20 Claims, 6 Drawing Sheets

(51) Int. Cl.
*G06T 5/00* (2006.01)
*G06T 5/50* (2006.01)
*G06T 7/00* (2017.01)

(52) U.S. Cl.
CPC ...... *G06T 7/55* (2017.01); *G06T 2207/20216* (2013.01); *G06T 2207/20224* (2013.01)

(56) References Cited

U.S. PATENT DOCUMENTS

| | | | | |
|---|---|---|---|---|
| 2003/0059093 | A1* | 3/2003 | Rosania | G06K 9/00127 382/128 |
| 2005/0251347 | A1* | 11/2005 | Perona | G06K 9/522 702/19 |
| 2006/0044317 | A1* | 3/2006 | Bourd | G06T 11/40 345/557 |
| 2018/0253858 | A1* | 9/2018 | Ni | G06T 7/75 |
| 2019/0213778 | A1* | 7/2019 | Du | G06T 17/00 |

OTHER PUBLICATIONS

Choudhury, Prasun, and Jack Tumblin. "The trilateral filter for high contrast images and meshes." ACM SIGGRAPH 2005 Courses. 2005. 5-es. (Year: 2005).*

Hernandez, Jorge et al., "3D and Texture Modelling of Precolombian Ojects", Advances in Visual Computer, Second International Symposium, 2006, pp. 822-830, XP002790161.

International Search Report and Written Opinion for International Application No. PCT/US2018/061265, dated Apr. 9, 2019, 18 pages.

Yemez, Y. et al., "3D reconstruction of real objects with high resolution shape and texture", Image and Vision Computing, vol. 22, No. 13, Nov. 1, 2004, pp. 1137-1153, XP004582701.

Mukaigawa, et al., "Color blending based on viewpoint and surface normal for generating images from any viewpoint using multiple cameras", IEEE Conf. on Multisensor Fusion and Integration for Intelligent Systems, Jul.-Aug. 2003, Tokyo, 2003. pp. 95-100.

Reeves, et al., "Rendering Antialiased Shadows with Depth Maps", Computer Graphics, Jul. 4, 1987, 283-291.

* cited by examiner

SMOOTHED NORMALS FROM DEPTH MAPS FOR NORMAL-BASED TEXTURE BLENDING

CROSS REFERENCE TO RELATED APPLICATIONS

This application is a 35 U.S.C. § 371 National Phase Entry Application from PCT/US2018/061265, filed on Nov. 15, 2018, and designating the U.S., which claims the benefit of U.S. Patent Application No. 62/590,505, filed on Nov. 24, 2017, the disclosures of which are incorporated by reference herein in their entireties.

TECHNICAL FIELD

This description relates to texture mapping onto computer-generated, three-dimensional objects.

BACKGROUND

Texture mapping involves applying an image to a given surface in three-dimensional space. For example, a camera may capture an image of a person's face that includes texture attributes such as color and shading. A texture-mapping system may then map the texture attributes onto a three-dimensional geometry representing the shape of the person's face. In some applications such as games and motion pictures in virtual reality systems, there may be objects occluding the object representing the person's face. In this case, texture mapping involves generating shadow, or occlusion maps from the other objects onto the object representing the person's face. To more accurately map the texture, the texture-mapping system may use images from multiple cameras arranged at set angles relative to the person. The texture mapping is then an average over the images captured by each camera. In texture mapping, the average over the images can be uniformly weighted using a visibility at a point on the object as seen from each camera based on a number of points in the vicinity of the point in the shadow region that are occluded. Such a visibility mapping provides soft transitions to and from the shadow regions generated based on occluding objects in the neighborhood of the object of interest.

SUMMARY

In one general aspect, a method can include receiving, by processing circuitry of a computer configured to perform texture mapping operations on data representing geometrical objects in an image environment, (i) geometrical object data representing a geometrical object in the image environment and (ii) image data representing respective images of a textured object captured by a plurality of cameras, each of the plurality of cameras having an orientation with respect to the textured object. The method can also include, for each of the plurality of cameras, obtaining, by the processing circuitry, a smoothed normal corresponding to that camera at a point on a surface of the geometrical object, the smoothed normal being evaluated by weighted sums of pixels in a depth map onto which the geometrical object is projected. The method can further include, for each of the plurality of cameras, generating, by the processing circuitry, a respective weight corresponding to that camera, the weight being based on a dot product of the orientation of that camera and the smoothed normal corresponding to that camera. The method can further include generating, by the processing circuitry, a weighted average of the images of the textured object captured by the plurality of cameras to produce a texture-mapped object in the image environment, the image of the textured object captured by each of the plurality of cameras being weighted by the weight corresponding to that camera.

The details of one or more implementations are set forth in the accompanying drawings and the description below. Other features will be apparent from the description and drawings, and from the claims.

DETAILED DESCRIPTION

While texture mapping using the above-described uniform weights in occlusion regions provides soft transitions in the shadow regions in the presence of occluding objects, the resulting image is blurry. One reason for the blur is that the above-described uniform weighting is independent of the geometry onto which the texture is being mapped. For example, in some applications such as games and motion pictures in virtual reality systems, the ability to perform texture mapping accurately may depend on the viewpoint of an observer as well as the viewpoint of the camera or cameras that captured the image. Such applications may then use a view-dependent weighting which depends not only on the visibility from each camera but also a power of cosine of the angle between the viewpoint orientation and each camera orientation. It turns out, however, that while the view-dependent weighting reduces blur, it produces inaccurate artifacts for viewpoints not parallel to a camera orientation.

To solve the problem of introducing artifacts in view-dependent weighting, some texture mapping applications use a normal-dependent weighting. In normal-dependent weighting, each image captured by a camera is weighted according to the visibility and a power of a cosine between the camera orientation and a normal to the surface of the object of interest at a point on the surface. While normal-dependent weighting directly considers the shape of the object in question, it can introduce rippling onto the texture when surface normals are derived from noisy local estimates in scanned data due to the inherent noisiness of computing surface normals.

Some texture mapping applications that use normal-dependent weighting perform a smoothing operation on the surface normals before averaging. Conventional approaches to smoothing surface normals in a texture mapping application involve averaging the normal of all the object surfaces over a local region in an entire voxel grid. While such an approach may result in accurate smoothing and texture mapping, it is also consumes a heavy amount of computational resources and is difficult to accelerate.

In accordance with the implementations described herein, improved techniques of smoothing surface normals in a texture mapping application involve generating smoothed normals from the perspective of each camera using to capture images for texture mapping. Along these lines, a camera used to capture an image for texture mapping is situated at an orientation relative to the geometrical object onto which a texture mapping computer maps the texture image. The texture mapping computer places a filter window centered at a point on the geometrical object. The texture mapping computer then generates, as the smoothed normal at that point, an average normal over points in the filter window. The average normals thus computed for each camera are then used in the weights of the weighted average that is the image value at that point.

Further, the texture mapping computer performs the computation of these average normals only over a depth map rather than an entire voxel grid. The texture mapping computer generates the depth map (or occlusion map) by projecting the geometrical objects into the image (or texture) domain. This domain is a two-dimensional space rather than a three-dimensional space like the voxel grid.

Advantageously, the smoothed normals computed this way do not suffer the artifacts, ripples, or blurriness associated with approaches to texture mapping that do not use smoothed normals, or the expensive computations used in the conventional approaches using smoothed normals. In many cases, an average depth map of the object relative to other objects occluding or being occluded by the geometrical object indicates that normals computed within transition or shadow regions near the boundary of the geometrical object are pointed away and nearly perpendicular to the orientation of the camera. (A normal to a point on an average depth map is equivalent to an averaged normal at a point on the surface of the geometrical object.) Accordingly, any errors induced by the averaging process in the transition region are downweighted. Furthermore, averaging the normals over the depth map is much faster than over an entire voxel grid.

Figure 1:
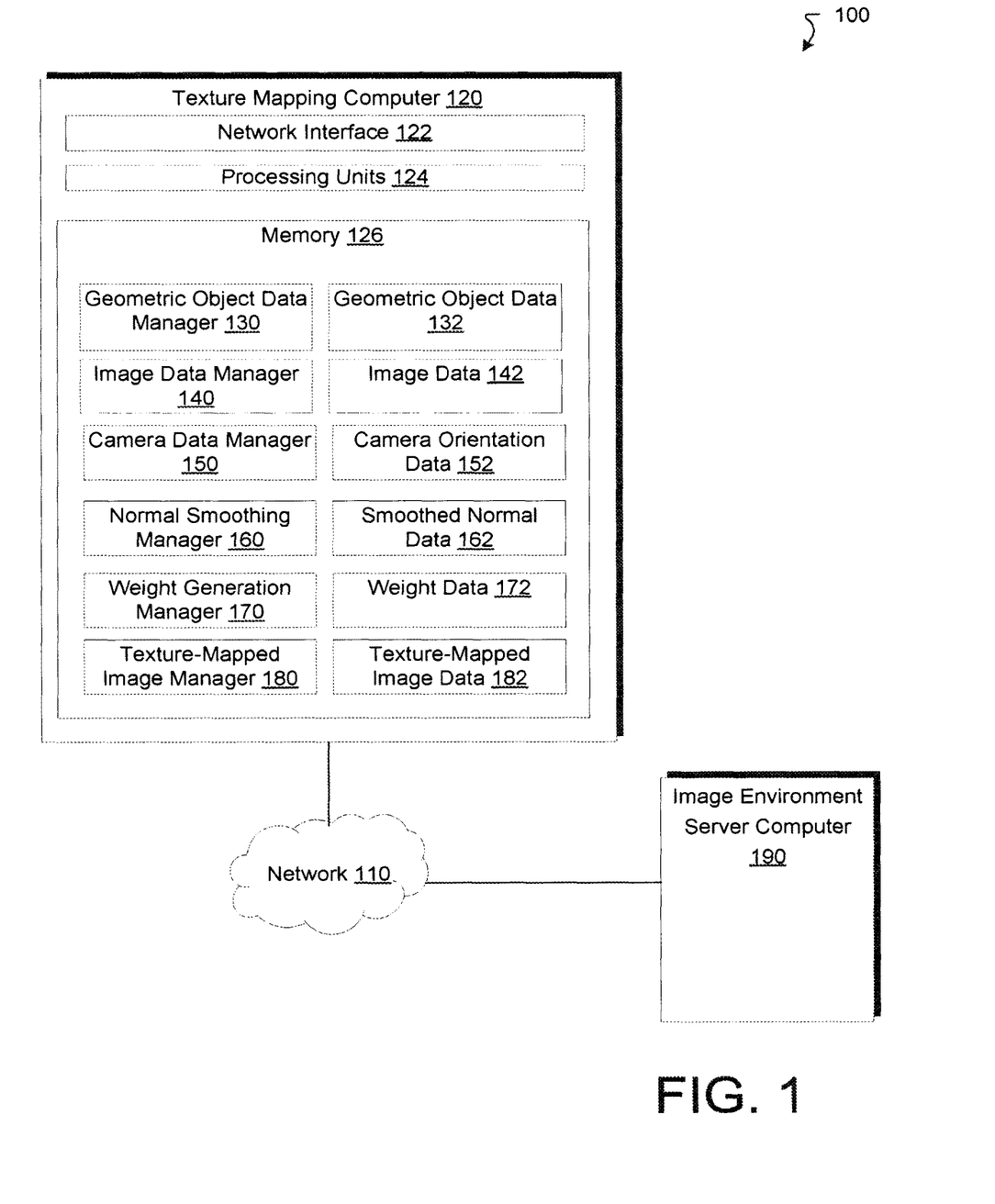
FIG. 1 is a diagram that illustrates an example electronic environment in which improved techniques described herein may be implemented.

FIG. 1 is a diagram that illustrates an example electronic environment 100 in which the above-described improved techniques may be implemented. As shown, in FIG. 1, the electronic environment 100 includes a network 110, a texture mapping computer 120, and an image environment server computer 190.

The network 110 is configured and arranged to provide network connections between the texture mapping computer 120 and the media server computer 190. The network 110 may implement any of a variety of protocols and topologies that are in common use for communication over the Internet or other networks. Further, the network 110 may include various components (e.g., cables, switches/routers, gateways/bridges, etc.) that are used in such communications.

The texture mapping computer 120 is configured to generate smoothed normals to geometrical objects for texture mapping. The texture mapping computer 120 includes a network interface 122, one or more processing units 124, and memory 126. The network interface 122 includes, for example, Ethernet adaptors, Token Ring adaptors, and the like, for converting electronic and/or optical signals received from a network to electronic form for use by the user device computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the texture mapping computer 120 can be, or can include processors (e.g., processing units 124) configured to process instructions stored in the memory 126. Examples of such instructions as depicted in FIG. 1 include a geometrical object data manager 130, an image data manager 140, an camera data manager 150, a normal smoothing manager 160, a weight generation manager 170, and a texture-mapped image manager 180. Further, as illustrated in FIG. 1, the memory 126 is configured to store various data, which is described with respect to the respective managers that use such data.

The geometrical object data manager 130 is configured to receive geometrical object data 132 over the network 110 via the network interface 122. In one example, the geometric object data 132 includes triangles or polygons that are used to define a geometrical object, e.g., a human head, in three-dimensions. In another example, the geometrical object data includes points, e.g., of a point cloud, used to define such a geometrical object. In the case of the geometrical object data including triangles or polygons, the normal to the surface of the object is constant over each triangle and polygon. In some implementations, the normal at an edge of a triangle or polygon is an average of the normals of the triangles or polygons sharing that edge.

The image data manager 140 is configured to receive image data 142 over the network 110 via the network interface 122. In some implementations, the image data 142 represents images of the surface of an object, e.g., a user's face, from different perspectives. Such image data 142 may include pixels that define a picture from each perspective. Each pixel of an image represents a point in texture image space.

In some implementations, the geometrical object data manager 130 and the image data manager 140 are configured to receive the geometrical object data 132 and the image data 142 from the image environment server computer 190. For example, the image environment server computer 190 may be included as part of a virtual reality system that can scan the shape of a user and also has cameras that take images of the user from various perspectives.

The camera data manager 150 is configured to obtain camera orientation data 152. In some implementations, the camera orientation data 152 includes the angle at which each camera that acquires the image data 142 is with respect to a fixed coordinate system. In some implementations, the coordinate system is defined with respect to a fixed object, e.g., a wall. In some implementations, the coordinate system is defined with respect to the user at a particular time. In some implementations, the camera orientation data 152 includes azimuthal and polar angles of each camera.

The normal smoothing manager 160 is configured to acquire surface normals of the geometrical object based on the geometrical object data 132 and generate smoothed normals at the points at which the normals are defined in the geometrical object data 132. For example, as stated above, when the geometric object data 132 includes triangles or polygons, the normal at a point in the geometric object data 132 may be generated based on the orientation of the triangle or polygon in which the point is contained. The normal smoothing manager 160 is configured to smooth the normals differently for each camera that produced image data 142. Specifically, the normal smoothing manager 160 is configured to smooth a normal for a camera by generating a filter window, and a grid of points within the filter window. The normal smoothing manager 160 is then configured to generate, as the smoothed normal data 162, an average normal over the normals of the points in the filter window. An example size of a filter window is eight pixels in width and depth, with four samples in either direction. Other filter window sizes are possible. Further details of the averaging of the normals are discussed with respect to FIGS. 3, 4A, and 4B.

The weight generation manager 170 is configured to generate weight data 172 used in a computation of a weighted average that is the image value at a point. The weight generation manager 170 is configured to compute a dot product of the smoothed normal 162 at the point and the camera orientation 152 of a camera. In some implementations, the weight represented by the weight data 172 is proportional to that dot product raised to a predetermined power. In some implementations, the predetermined power is between 1 and 10. In some implementations, the weight is further proportional to a visibility factor of the point from the perspective of a camera.

The texture-mapped image manager 180 is configured to produce the texture-mapped image data 182 that represents the result of the texture mapping operation that maps the image data 142 onto the geometric object represented by the geometric object data 132. In some implementations, the texture-mapped image manager 180 is configured to generate a weighted average of the image data 142 using the weight data 172. In some implementations, the texture-mapped image data 182 is also configured to send the texture-mapped image data to the image environment server computer 190.

The components (e.g., modules, processing units 124) of the texture mapping computer 120 can be configured to operate based on one or more platforms (e.g., one or more similar or different platforms) that can include one or more types of hardware, software, firmware, operating systems, runtime libraries, and/or so forth. In some implementations, the components of the texture mapping computer 120 can be configured to operate within a cluster of devices (e.g., a server farm). In such an implementation, the functionality and processing of the components of the texture mapping computer 120 can be distributed to several devices of the cluster of devices.

The components of the texture mapping computer 120 can be, or can include, any type of hardware and/or software configured to process attributes. In some implementations, one or more portions of the components shown in the components of the texture mapping computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the texture mapping computer 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the texture mapping computer 120 (or portions thereof) can be configured to operate within a network. Thus, the components of the texture mapping computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the texture mapping computer 120 can be, or can include, processors configured to process instructions stored in a memory. For example, a geometrical object data manager 130 (and/or a portion thereof), an image data manager 140 (and/or a portion thereof), a camera data manager 150 (and/or a portion thereof), a normal smoothing manager 160 (and/or a portion thereof), a weight generation manager 170 (and/or a portion thereof), and a texture-mapped image manager 180 (and/or a portion thereof) can be a combination of a processor and a memory configured to execute instructions related to a process to implement one or more functions.

Figure 2:
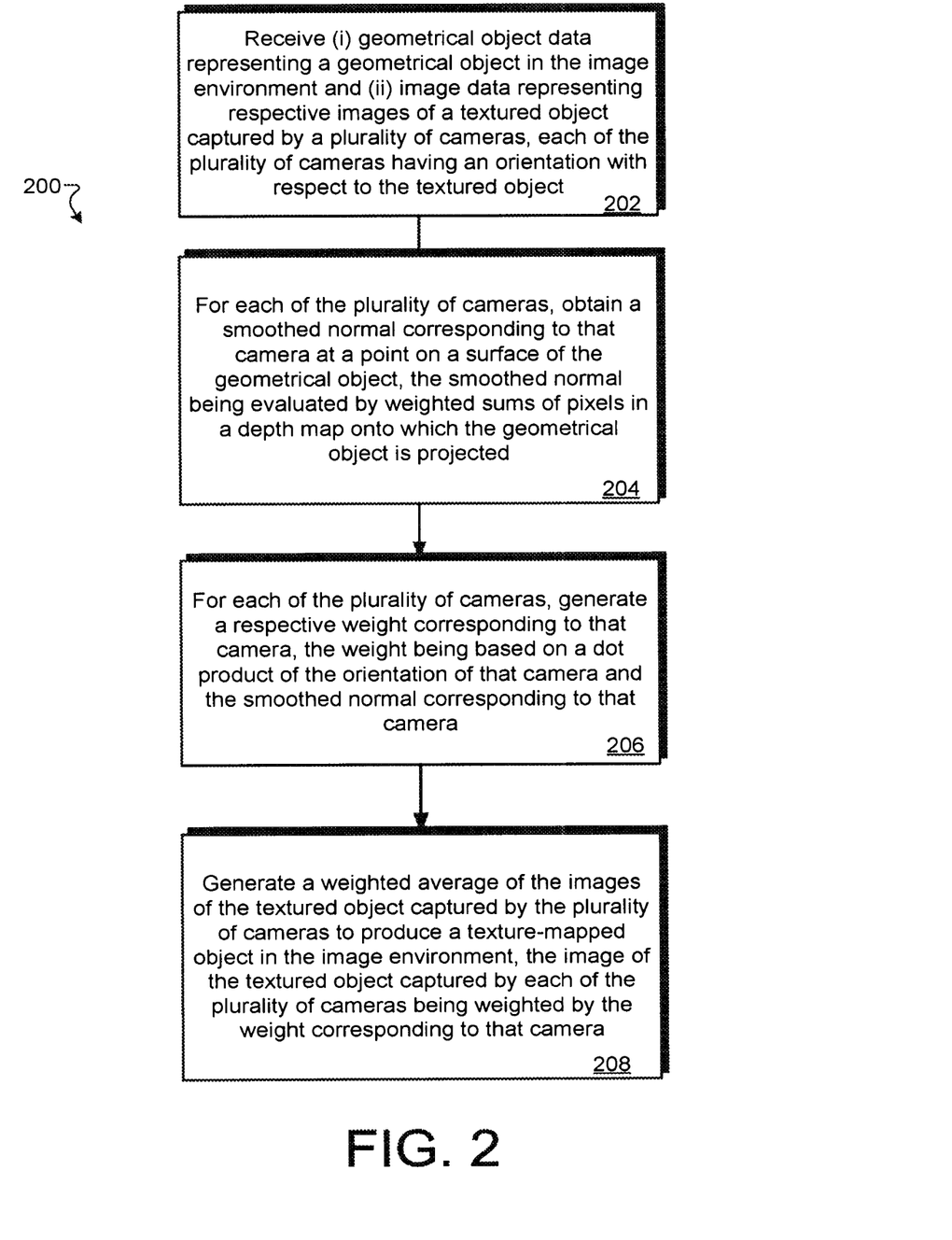
FIG. 2 is a flow chart that illustrates an example method of implementing the improved techniques as shown in FIG. 1.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the user device computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the user device computer 120. As illustrated in FIG. 2, the memory 126 is configured to store various data, including geometrical object data 132, image data 142, camera orientation data 152, smoothed normal data 162, weight data 172, and texture-mapped image data 182.

FIG. 2 is a flow chart depicting an example method 200 of performing texture mapping using smoothed normals. The method 200 may be performed by software constructs described in connection with FIG. 1, which reside in memory 126 of the texture mapping computer 120 and are run by the set of processing units 124.

At 202, the texture mapping computer 120 receives (i) geometrical object data representing a geometrical object in the image environment and (ii) image data representing respective images of a textured object captured by a plurality of cameras, each of the plurality of cameras having an orientation with respect to the textured object.

At 204, the texture mapping computer 120 obtains, for each of the plurality of cameras, a smoothed normal corresponding to that camera at a point on a surface of the geometrical object, the smoothed normal being evaluated by weighted sums of pixels in a depth map onto which the geometrical object is projected.

At 206, the texture mapping computer 120 generates, for each of the plurality of cameras, a respective weight corresponding to that camera, the weight being based on a dot product of the orientation of that camera and the smoothed normal corresponding to that camera.

At 208, the texture mapping computer 120 generates a weighted average of the images of the textured object captured by the plurality of cameras to produce a texture-mapped object in the image environment, the image of the textured object captured by each of the plurality of cameras being weighted by the weight corresponding to that camera.

Figure 3:
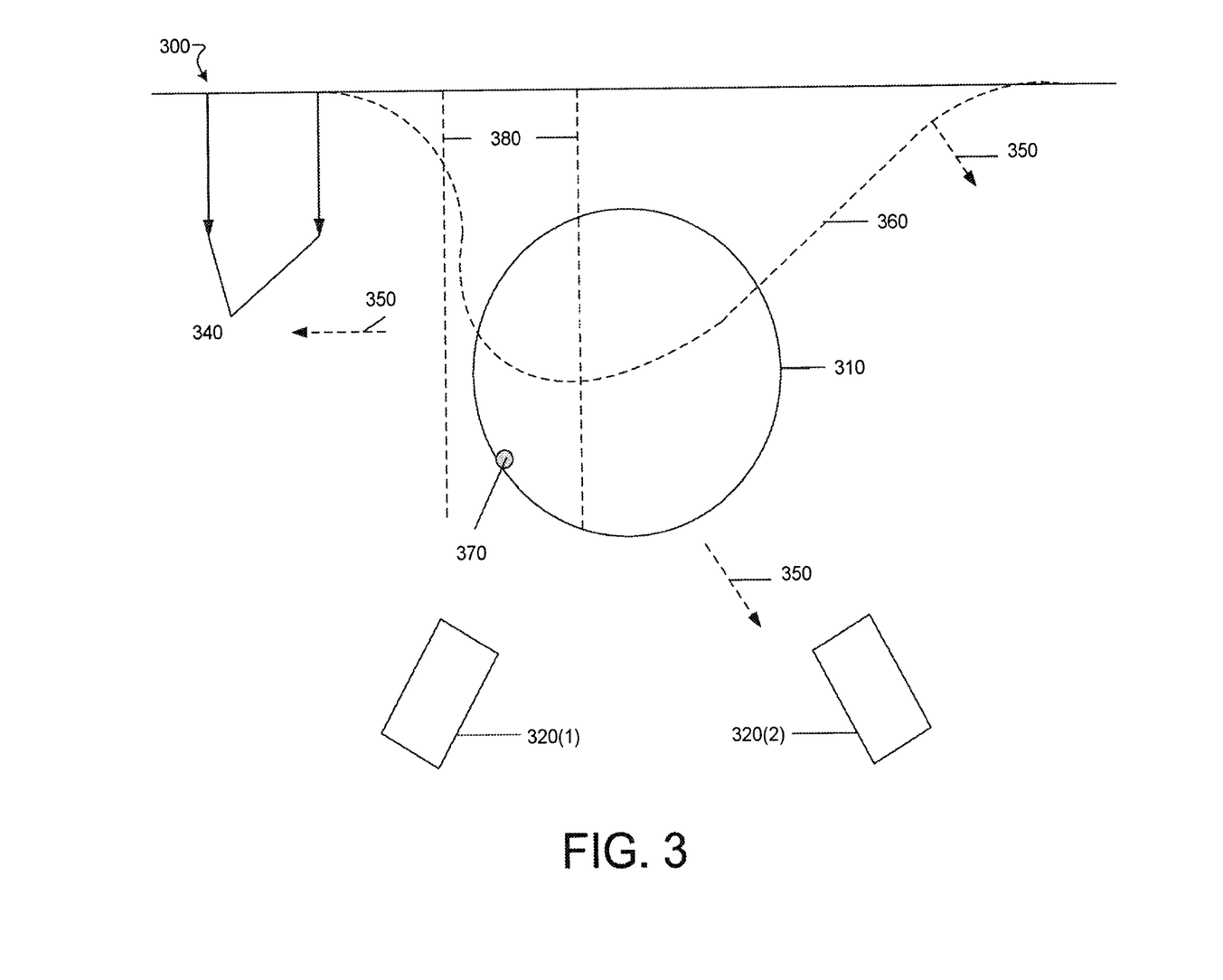
FIG. 3 is a diagram that illustrates an example geometrical object onto which a texture is to be mapped, along with an accompanying example depth map according to the improved techniques shown in FIG. 1.

FIG. 3 is a diagram that illustrates an example scene containing a geometrical projected onto a two-dimensional depth map, as seen from above. In the diagram, an object 310 is in front of a wall 300 and illuminated in its front. The cameras 320(1) and 320(2) are each oriented toward the object 310 at various angles. The objective is to accurately compute values of, e.g., color, brightness, bump height, etc. ("image values" hereinafter) at the point 370 on the surface of the object 310. Although there are only two cameras shown in FIG. 3, there can be any number N of cameras used. Generally, the image value at the point 370 is a weighted average over the camera images $I_i$:

$$I = \frac{\sum_{i=1}^{N} w_i I_i}{\sum_{i=1}^{N} w_i}.$$

where the weight $w_i$ corresponding to the $i^{th}$ camera is given by $$w_i = v_i (\hat{N}_i \cdot \hat{E}_i)^\alpha,$$

where $\hat{N}_i$ is the smoothed normal associated with the $i^{th}$ camera at the point 370, $\hat{E}_i$ is the orientation of the $i^{th}$ camera, $v_i$ is a visibility of the point 370 associated with the $i^{th}$ camera, and $\alpha$ is a predetermined constant.

Figure 4A:
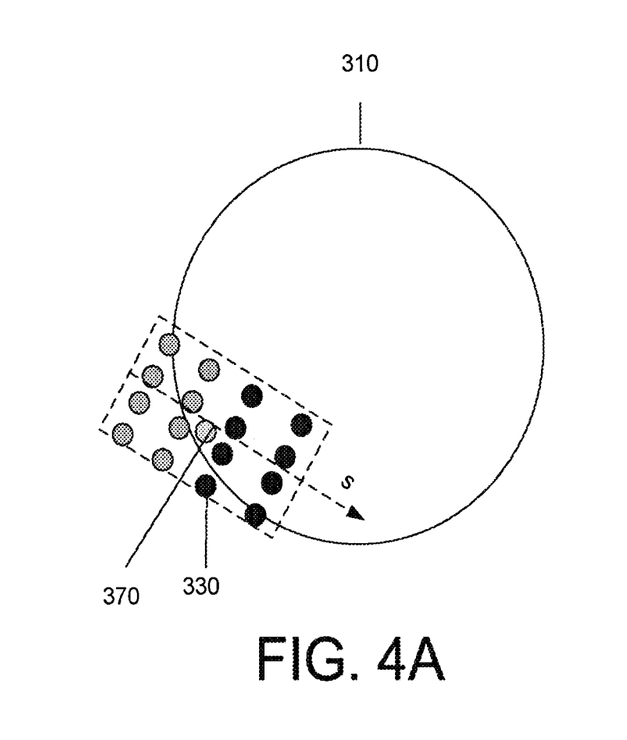
FIGS. 4A and 4B are diagrams that illustrate an example process of generating smoothed normals according to the improved techniques shown in FIG. 1.

FIG. 4A is a diagram illustrating a first part of an averaging process according to an implementation. According to this implementation, the points in the filter window 330 are divided into two groups: those on a first side of the point 370 along the s axis (light) and those on a second side of the 370 along the s axis (dark). The tangent in the filter window 330 is given by $$\tilde{P}_s = \sum_1 P_s - \sum_2 P_s$$

where the difference is between the sum over the points in the filter window 330 to the first side of the point 370 and the sum over the points in the filter window 330 to the second side of the point 370.

Figure 4B:
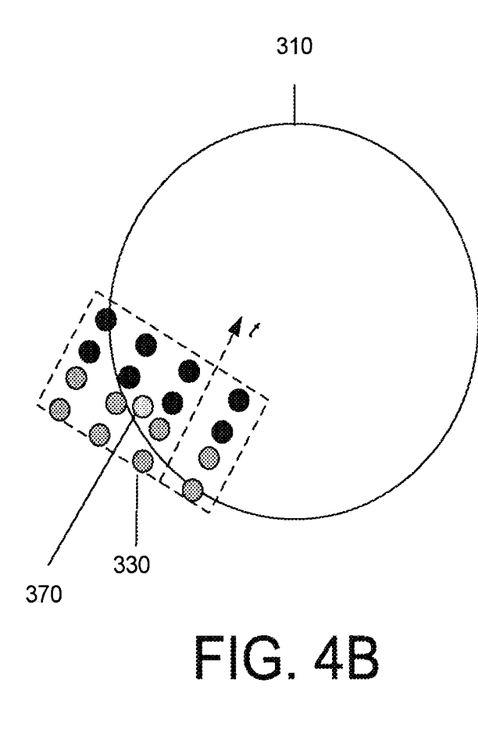

FIG. 4B is a diagram illustrating a second part of an averaging process according to an implementation. According to this implementation, the points in the filter window 330 are divided into two groups: those on one side of the point 370 along the t axis (light) and those on the other side of the 370 along the t axis (dark). The tangent in the filter window 330 is given by $$\tilde{P}_t = \sum_1 P_t - \sum_2 P_t$$

where the difference is between the sum over the points in the filter window 330 to the first side of the point 370 and the sum over the points in the filter window 330 to the second side of the point 370.

The smoothed normal at the point 370 is then equal to the cross product between the smoothed tangents described above, i.e., $$\hat{N}_i = \tilde{P}_s \times \tilde{P}_t$$

Further, either diagram in FIG. 4A or FIG. 4B may be used to compute the visibility $v_i$ via percentage closer filtering. The visibility is defined to be the percentage of points in the filter window 330 visible to the further objects in the face of an occluding object up close. In the case illustrated in FIGS. 4A and 4B, the visibility is 6/16. Moreover, this percentage closer filtering can use the same texture samples as normal estimation, resulting in additional speedup by combining the cost of these two estimates.

Returning to FIG. 3, the depth map 360 of the object illustrates what is happening when considering the image to be generated from the camera 320(1). In FIG. 3, the depth map 360 is actually a smoothed depth map with continuous behavior in the transition (shadow) region 380. The smoothing occurs over a region that is oriented based on the orientation of the camera 320(1), so a similar depth map associated with camera 320(2) would be different.

The normals to the averaged depth map 360 represent averaged normals at points throughout the scene. Accordingly, in the transition region 380, the average normals 350 as indicated by the depth map 360 point away from and are nearly perpendicular to the camera 320(1). The contribution to the weights $w_i$ at such points is negligible because the dot products between the smoothed normal and the camera orientation to almost zero. Thus, places where the averaged normals are highly inaccurate do not make any meaningful contribution to the corresponding weight $w_i$. Because the largest inaccuracies in the normal computation are in the transition region 380, the resulting image will be free of errors such as ripples, artifacts, and blur.

Figure 5:
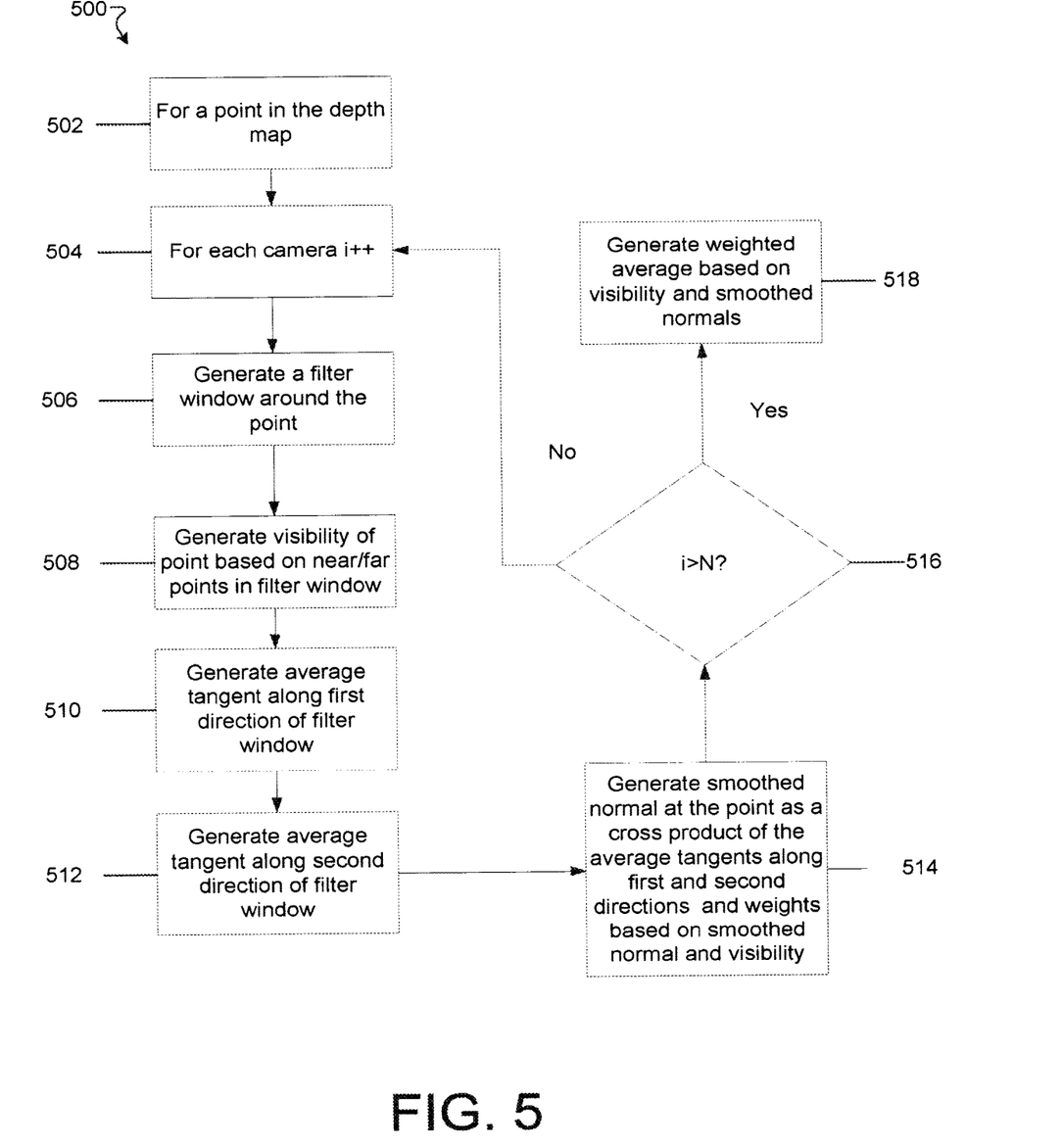
FIG. 5 is a diagram that illustrates an example process of generating weighted-average texture images according to the improved techniques shown in FIG. 1.

FIG. 5 is a flow chart depicting an example process 500 of generating weights using smoothed normals. The method 200 may be performed by software constructs described in connection with FIG. 1, which reside in memory 126 of the texture mapping computer 120 and are run by the set of processing units 124.

At 502, the normal smoothing manager 160 selects a point represented by the point data 132. At 504, the normal smoothing manager 160 selects, by iterating through the cameras, image data 142 and an orientation 152 corresponding to that camera.

At 506, the normal smoothing manager 160 generates a filter window (e.g., filter window 330) that is parallel to the orientation of the camera. The filter window has a specified size and/or number of points and has two orthogonal axes.

At 508, the normal smoothing manager 160 generates a visibility $v_i$ based on a ratio of a number of points in the filter window close to the camera, i.e., on a surface of an object close to the camera, to the total number of points in the filter window.

At 510, the normal smoothing manager 160 generates an average tangent along a first axis of the filter window as described above with regard to FIG. 4A.

At 512, the normal smoothing manager 160 generates an average tangent along a second axis of the filter window as described above with regard to FIG. 4B.

At 514, the normal smoothing manager 160 generates the smoothed normal at the point by taking the cross product of the average tangent along the first axis of the filter window and the average tangent along the second axis of the filter window. The weight generation manager 170 then generates the weight based on the smoothed normal and the visibility as described above with regard to FIG. 3.

At 516, the normal smoothing manager 160 evaluates whether all of the cameras have been considered. If there are still more cameras to consider, then the normal smoothing manager 160 selects the next camera orientation and repeats 502-514. If not, then at 518 the texture-mapped image manager 180 performs a weighted average of the images using the generated weights to produce the image value at the point.

Figure 6:
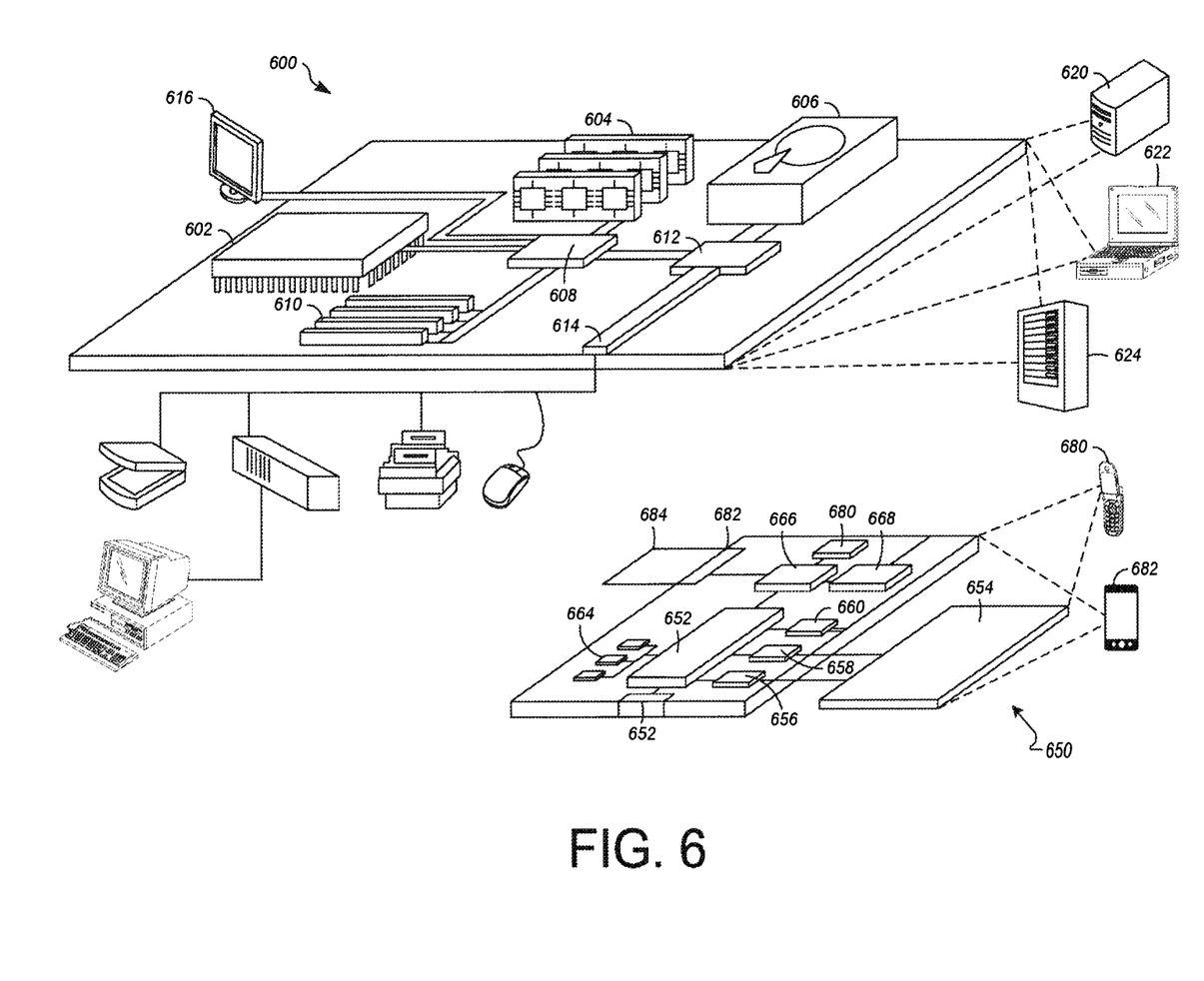
FIG. 6 illustrates an example of a computer device and a mobile computer device that can be used with circuits described here.

FIG. 6 illustrates an example of a generic computer device 600 and a generic mobile computer device 650, which may be used with the techniques described here.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 500, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    receiving, by processing circuitry of a computer configured to perform texture mapping operations on data representing geometrical objects in an image environment, (i) geometrical object data representing a geometrical object in the image environment and (ii) image data representing respective images of a textured object captured by a plurality of cameras, each of the plurality of cameras having an orientation with respect to the textured object;
    for each of the plurality of cameras:
        obtaining, by the processing circuitry, a smoothed normal corresponding to that camera at a point on a surface of the geometrical object, by (i) generating a filter window that includes the point, a grid of points, and a first and second axis, and (ii) generating, based on differences between points of the grid of points on opposite sides of the first and second axes, a first tangent and a second tangent corresponding to the first axis and second axis, respectively; and
        generating, by the processing circuitry, a respective weight corresponding to that camera, the weight being based on a dot product of the orientation of that camera and the smoothed normal corresponding to that camera; and
    generating, by the processing circuitry, a weighted average of the images of the textured object captured by the plurality of cameras to produce a texture-mapped object in the image environment, the image of the textured object captured by each of the plurality of cameras being weighted by the weight corresponding to that camera.

2. The method as in claim 1, wherein obtaining the smoothed normal corresponding to each of the plurality of cameras at the point on the surface of the geometrical object includes:
    obtaining a first average coordinate of specified points along a first axis of the filter window;
    generating a tangent to the surface at the first average coordinate to produce the first tangent;
    obtaining a second average coordinate of specified points along a second axis of the filter window; and
    generating a tangent to the surface at the second average coordinate to produce the second tangent
    generating a cross product of the first tangent and the second tangent to produce the smoothed normal.

3. The method as in claim 2, wherein obtaining the first average coordinate of the specified points along the first axis of the filter window includes:
    averaging depths of the specified points that lie on a first side of the point on the surface of the geometrical object with respect to the first axis to produce a first average point;
    averaging depths of the specified points that lie on a second side of the point on the surface of the geometrical object with respect to the first axis to produce a second average point; and
    producing, as the first tangent, a difference between the first average point and the second average point.

4. The method as in claim 2, wherein obtaining the second average coordinate of the specified points along the second axis of the filter window includes:
    averaging depths of the specified points that lie on a first side of the point on the surface of the geometrical object with respect to the second axis to produce a first average point;
    averaging depths of the specified points that lie on a second side of the point on the surface of the geometrical object with respect to the second axis to produce a second average point; and
    producing, as the second tangent, a difference between the first average point and the second average point.

5. The method as in claim 1, further comprising performing a projection operation on the geometrical object data to produce a two-dimensional depth map of the geometrical object, and
    wherein obtaining the smoothed normal corresponding to each of the plurality of cameras at a point on a surface of the geometrical object includes averaging normals over a region of the depth map.

6. The method as in claim 1, wherein the number of points in the filter window is specified.

7. The method as in claim 6, wherein the points in the filter window are evenly divided about the point.

8. The method as in claim 1, wherein the weight is further based on a visibility of the point, the visibility being based on a number of points in the filter window that are on the surface of the geometrical object.

9. A computer program product comprising a nontransitive storage medium, the computer program product including code that, when executed by processing circuitry of a server computing device configured to perform texture mapping operations on data representing geometrical objects in an image environment, causes the processing circuitry to perform a method, the method comprising:
    receiving (i) geometrical object data representing a geometrical object in the image environment and (ii) image data representing respective images of a textured object captured by a plurality of cameras, each of the plurality of cameras having an orientation with respect to the textured object;
    for each of the plurality of cameras:
        obtaining a smoothed normal corresponding to that camera at a point on a surface of the geometrical object, by (i) generating a filter window that includes the point, a grid of points, and a first and second axis, and (ii) generating, based on differences between points of the grid of points on opposite sides of the first and second axes, a first tangent and a second tangent corresponding to the first axis and second axis, respectively; and generating a respective weight corresponding to that camera, the weight being based on a dot product of the orientation of that camera and the smoothed normal corresponding to that camera; and generating a weighted average of the images of the textured object captured by the plurality of cameras to produce a texture-mapped object in the image environment, the image of the textured object captured by each of the plurality of cameras being weighted by the weight corresponding to that camera.

10. The computer program product as in claim 9, wherein obtaining the smoothed normal corresponding to each of the plurality of cameras at the point on the surface of the geometrical object further includes:

obtaining a first average coordinate of specified points along a first axis of the filter window;

generating a tangent to the surface at the first average coordinate to produce the first tangent;

obtaining a second average coordinate of specified points along a second axis of the filter window; and generating a tangent to the surface at the second average coordinate to produce the second tangent generating a cross product of the first tangent and the second tangent to produce the smoothed normal.

11. The computer program product as in claim 10, wherein obtaining the first average coordinate of the specified points along the first axis of the filter window further includes:

averaging depths of the specified points that lie on a first side of the point on the surface of the geometrical object with respect to the first axis to produce a first average point;

averaging depths of the specified points that lie on a second side of the point on the surface of the geometrical object with respect to the first axis to produce a second average point; and producing, as a first tangent, a difference between the first average point and the second average point.

12. The computer program product as in claim 10, wherein obtaining the second average coordinate of the specified points along the second axis of the filter window includes:

averaging depths of the specified points that lie on a first side of the point on the surface of the geometrical object with respect to the second axis to produce a first average point;

averaging depths of the specified points that lie on a second side of the point on the surface of the geometrical object with respect to the second axis to produce a second average point; and producing, as the first tangent, a difference between the first average point and the second average point.

13. The computer program product as in claim 9, wherein the weight is further based on a visibility of the point, the visibility being based on a number of points in the filter window that are on the surface of the geometrical object.

14. The computer program product as in claim 9, wherein the method further comprises performing a projection operation on the geometrical object data to produce a two-dimensional depth map of the geometrical object, and wherein obtaining the smoothed normal corresponding to each of the plurality of cameras at a point on a surface of the geometrical object includes averaging normals over a region of the depth map.

15. An electronic apparatus configured to perform texture mapping operations on data representing geometrical objects in an image environment, the electronic apparatus comprising:

memory; and controlling circuitry coupled to the memory, the controlling circuitry being configured to:

receive (i) geometrical object data representing a geometrical object in the image environment and (ii) image data representing respective images of a textured object captured by a plurality of cameras, each of the plurality of cameras having an orientation with respect to the textured object;

for each of the plurality of cameras:

obtain a smoothed normal corresponding to that camera at a point on a surface of the geometrical object by (i) generating a filter window that includes the point, a grid of points, and a first and second axis, and (ii) generating, based on differences between points of the grid of points on opposite sides of the first and second axes, a first tangent and a second tangent corresponding to the first axis and second axis, respectively; and generate a respective weight corresponding to that camera, the weight being based on a dot product of the orientation of that camera and the smoothed normal corresponding to that camera; and generate a weighted average of the images of the textured object captured by the plurality of cameras to produce a texture-mapped object in the image environment, the image of the textured object captured by each of the plurality of cameras being weighted by the weight corresponding to that camera.

16. The electronic apparatus as in claim 15, wherein the controlling circuitry configured to obtain the smoothed normal corresponding to each of the plurality of cameras at the point on the surface of the geometrical object is further configured to:

obtain a first average coordinate of specified points along a first axis of a filter window;

generate a tangent to the surface at the first average coordinate to produce the first tangent;

obtain a second average coordinate of specified points along a second axis of the filter window; and generate a tangent to the surface at the second average coordinate to produce the second tangent.

17. The electronic apparatus as in claim 16, wherein the controlling circuitry configured to obtain the first average coordinate of the specified points along the first axis of the filter window is further configured to:

average depths of the specified points that lie on a first side of the point on the surface of the geometrical object with respect to the first axis to produce a first average point;

average depths of the specified points that lie on a second side of the point on the surface of the geometrical object with respect to the first axis to produce a second average point; and produce, as the first tangent, a difference between the first average point and the second average point.

18. The electronic apparatus as in claim 16, wherein the controlling circuitry configured to obtain the second average coordinate of the specified points along the second axis of the filter window is further configured to:
- average depths of the specified points that lie on a first side of the point on the surface of the geometrical object with respect to the second axis to produce a first average point;
- average depths of the specified points that lie on a second side of the point on the surface of the geometrical object with respect to the second axis to produce a second average point; and
- produce, as the second tangent to the surface, a difference between the first average point and the second average point.

19. The electronic apparatus as in claim 15, wherein the controlling circuitry is further configured to perform a projection operation on the geometrical object data to produce a two-dimensional depth map of the geometrical object, and
- wherein the controlling circuitry configured to obtain the smoothed normal corresponding to each of the plurality of cameras at a point on a surface of the geometrical object is further configured to average normals over a region of the depth map.

20. The electronic apparatus as in claim 15, wherein the weight is further based on a visibility of the point, the visibility being based on a number of points in the filter window that are on the surface of the geometrical object.

* * * * *